United States Patent [19]

Elward-Berry

[11] Patent Number: 5,244,877
[45] Date of Patent: * Sep. 14, 1993

[54] RHEOLOGICALLY STABLE WATER-BASED HIGH TEMPERATURE DRILLING FLUIDS

[75] Inventor: Julianne Elward-Berry, Houston, Tex.

[73] Assignee: Exxon Production Research Company, Houston, Tex.

[*] Notice: The portion of the term of this patent subsequent to Jan. 12, 2010 has been disclaimed.

[21] Appl. No.: 918,294

[22] Filed: Jul. 22, 1992

Related U.S. Application Data

[63] Continuation-in-part of Ser. No. 531,981, Jun. 1, 1990, Pat. No. 5,179,076.

[51] Int. Cl.$^5$ .............................................. C09K 7/02
[52] U.S. Cl. .................................................. 507/112
[58] Field of Search .......................................... 507/112

[56] References Cited

U.S. PATENT DOCUMENTS 4,629,575 12/1986 Weibel ............................... 507/112

OTHER PUBLICATIONS

Aqualon literature entitled "HP-077 TM Polymer" Apr. 1989.

Primary Examiner—Gary Geist
Attorney, Agent, or Firm—Susan A. McLean

[57] ABSTRACT

A water-based fluid for use in the drilling of wells is disclosed. This fluid: is rheologically stable over a wide temperature range, from room temperature to at least about 475° F., thus reducing drilling time in high temperature applications; typically necessitates minimal disposal rates in operation; is resistant to temperature-induced carbonate gellation; creates a thin filter cake; and combines the low toxicity of a water-based fluid with the performance stability of an oil-based fluid.

As further disclosed herein, this drilling fluid comprises a water-based colloidal suspension of certain readily available drilling fluid components, including clay, an inorganic salt, and parenchymal cell cellulose ("PCC").

9 Claims, 5 Drawing Sheets

RHEOLOGICALLY STABLE WATER-BASED HIGH TEMPERATURE DRILLING FLUIDS

RELATED APPLICATIONS

This is a Continuation-In-Part of Application 07/531,981, filed Jun. 1, 1990 now U.S. Pat. No. 5,179,076.

FIELD OF THE INVENTION

This invention pertains to water-based drilling fluids that retain rheological stability over a range of temperatures from ambient to in excess of 475° F.

DESCRIPTION OF THE RELATED ART

It is well known in the art that drilling fluids must be used in connection with the drilling of wells, such as those in the oil and gas industry. Such fluids, or "muds," serve several functions in the drilling process. These functions include: removal of drilled cuttings, suspension of high specific gravity weight material and fine cuttings, sealing of the sides of the wellbore so as to minimize drilling fluid loss into the formation, provision of a hydrostatic head to prevent blowouts from high pressure fluids into the wellbore or up through the wellbore to the surface, creation of a low-friction surface on the wellbore to facilitate rotation and removal of the drill string as operational conditions require, cooling of the drill bit and lubrication to prevent the drill pipe from sticking during rotation.

Drilling muds are typically colloidal suspensions of certain viscosifiers and filtration control materials, such as clays, as well as of fine drilled solids, in either oil or water. Typical clay concentrations in drilling muds range from about 10 to about 50 lb/bbl. Various chemicals are added to alter, enhance, influence or modify the properties of the suspension, as is well known in the art. For example, a weighting agent, such as barium sulfate, or "barite," is added to increase the density of the mud. Viscosifiers are used to increase viscosity and gel strength. Deflocculants, such as lignosulfonates, prevent the clay particles from forming, which flocs contribute to an increase in viscosity. Filtration control materials, such as soluble polymers or starch, are added to encourage the development of the filter cake on the sides of the wellbore so that a minimal amount of the drilling fluid will enter a permeable formation.

The search for oil and gas has led to the drilling of deeper wells in recent years. Because of the temperature gradient in the earth's crust, deeper wells have higher bottomhole temperatures. As is well known in the art and confirmed by Remont et al., there is a need for a drilling fluid which retains rheological stability throughout a broad temperature range for efficient drilling of these deeper wells. Additionally, as is known in the art, formations which have relatively high pore pressures require correspondingly denser drilling fluids to provide a hydrostatic head to prevent blowouts from high pressure fluids into the wellbore or up through the wellbore to the surface.

Because of their better thermal stability as compared to water-based fluids, oil-based fluids typically have been used in high temperature applications. However, as the environmental impact of the disposal of these spent slurries, and the drilled cuttings carried in these slurries, has become increasingly scrutinized, water-based fluids have become more and more the fluid of choice in the industry. Water-based fluids are also preferable in high pressure applications, such as deep wells, because oil-based fluids are more compressible than water-based fluids. This increased compressibility results in increased viscosity. A third advantage for water-based drilling fluids considers safety in well-control situations. Since gas is much more soluble in oil, an unanticipated influx of gas into the well cannot be detected as well at the surface in oil based drilling fluids until it is near the surface and very dangerous. On the other hand, with water-based drilling fluids, since gas is only sparingly soluble, such an influx can be detected more easily, the well shut-in, and the influx more safely handled at the surface.

For a mud to work well in high temperature bottomhole conditions, it must be rheologically stable over the entire range of temperatures to which it will be exposed. This range is generally from the flowline temperature which is 0° to 90° F. above ambient temperature to bottomhole temperature. For high temperature fluids, the flowline temperature is at the upper limit. The rheological stability of a mud is monitored by measuring its yield point and gel strengths, in accordance with standard drilling fluid tests, before and after circulation down the wellbore. These standard tests, which include the tests for yield point and gel strengths, are well known in the industry and are described in "Recommended Practice Standard Procedure for Field Testing Water-Based Drilling Fluids," Recommended Practice 13B-1 (1st ed. Jun. 1, 1990), American Petroleum Institute (hereinafter referred to as "RP 13B-1").

The major operational difficulty presented by a typical water-based mud at higher temperatures is that at such temperatures it degrades and becomes too viscous to be circulated easily. This circulation difficulty arises because the clays used in the muds are susceptible to temperature-induced gellation at temperatures as low as about 250° F. The circulation problems caused by the increased viscosity of the muds at higher temperatures are exacerbated during those time periods when drilling and circulation must be discontinued.

The prior art has several partial solutions to this high temperature difficulty, none of which is completely satisfactory. These solutions include: excessive dilution and dumping of spent fluids, addition of rheology-modifying chemicals, use of polymers instead of clay as viscosifiers, and use of foam drilling fluid. Dilution and dumping is not acceptable because it is expensive, requiring rebuilding of substantial fractions of the fluid system, and resulting in potentially large disposal costs. Addition of rheology-modifying chemicals only marginally elevates the temperature at which gellation initiates. Polymers used as viscosifiers are not acceptable in applications above approximately 250° F. to 300° F. due to the extreme degradation of the polymers, resulting in substantial loss of viscosity. Finally, water soluble foams are sometimes used for high temperature applications, but due to their low density they are ineffective for weighting or sealing and thus are not practical for use in situations where there is a large amount of water intrusion. They also have poor lubricating qualities and tend to be corrosive.

Recently, U. S. Pat. No. 4,629,575 to Weibel, which patent is incorporated herein by reference, has disclosed that parenchymal cell cellulose ("PCC") can be beneficially used in high temperature drilling fluids as a viscosifier; however, Weibel teaches that, due to thermal degradation, PCC is not effective as the sole viscosifier of a drilling fluid in high temperature applications above about 350° F. Therefore, there remains a need for a drilling fluid which remains rheologically stable through a wide temperature range, from ambient temperature to above about 475° F.

SUMMARY OF THE INVENTION

This invention relates to water-based drilling fluids which display rheological stability throughout a wide temperature range. This continuation-in-part of U.S. Pat. No. 07/531,981 focuses on the use of sulfate salts, as well as lower chlorides, the use of calcium chloride as the source for the chloride anion, and high density applications. For the purpose of this invention, "high-density" is deemed to be greater than about 16.0 lbs/gal. Although throughout this disclosure the phrase "the mud of this invention," or similar phrases, are used, it is to be understood that this invention encompasses a broad range of muds. Such phrases indicate a drilling fluid prepared in accordance with the methods taught herein. "Rheological stability" means that the effective viscosity at annular shear rate of the mud remains within an effective, relatively narrow range, between about 25 cp. and about 150 cp., but preferably between about 50 cp. and about 100 cp., over a broad temperature range, from the circulating flowline temperature to at least 475° F. This rheological stability enables the fluid to carry drilled cuttings efficiently at ambient temperatures. It also provides a sufficiently fluid viscosity at higher (bottomhole) temperatures to provide ease of circulation downhole. This invention also teaches the method for preparing and mixing the critical components of such a fluid, and a method for this fluid's use as a drilling mud.

The preferred drilling fluid comprises three components: clay, inorganic salt such as a chloride salt or a sulfate salt (or other such inorganic salts as are known in the art), and PCC. PCC was discussed above. The three components are preferably pretreated and then combined in proportions which result in a high density drilling fluid having the following characteristics: a yield point of about 10 lb/100ft$^2$ to about 30 lb/100ft$^2$; gel strengths of about 3 lb/100ft$^2$ to about 10 lb/100ft$^2$ for the 10-second measurement, about 15 lb/100ft$^2$ to about 30 lb/100ft$^2$ for the 10-minute measurement, and about 20 lb/100ft$^2$ to about 50 lb/100ft$^2$ for the 30-minute measurement; a high-temperature high-pressure (HTHP) filtration rate of less than about 50 cc/30 min. at 500 psi and 300° F.; and a pH between about 9.0 and about 11.5. These yield point, gel strength, HTHP filtration rate, and pH specifications set forth above relate to measurements made using standard tests for drilling fluids. Such standard tests are set forth in RP 13B-1. The respective characteristics for sulfate salt drilling fluids, as well as low chlorides and for calcium chlorides yield point of about 10 to about 25 lb/100 ft.$^2$, and gel strengths of 3 to 10, 10 to 30 and 20 to 35 lb/100 ft.$^2$ for the 10-second, 10-minute and 30-minute readings, respectively.

Applicant's laboratory tests have shown that muds having the above characteristics generally comprise: about 2 to about 15 lb/bbl clay; about 2,000 to about 125,000 parts chloride, or a corresponding amount of the other anionic salt species such as sulfate, per million parts fluid; and about 1 to about 8 lb/bbl PCC.

The economic impact of this invention is most directly realized by the reduced circulating and conditioning times, hence shortened drilling times, realized because of the ease of circulating the drilling fluid at elevated temperatures. Further, use of the drilling fluid of this invention results in reduced dilution, dumping and makeup. This reduced dilution, dumping and makeup results in savings not only in the purchase of components for this fluid, but also in the cost of disposal of the spent fluid. This reduced disposal volume makes this fluid not only economically but also environmentally attractive. Another significant benefit of the mud of this invention is that its preparation is simpler than the preparation of a typical mud of the prior art. Additionally, the toxicity of the spent fluid is lower than that of those fluids typically used in high temperature applications, especially oil-based fluids. Furthermore, the mud of this invention typically lays down a filter cake one-half to one-third as thick as the filter cakes typically laid down by the muds of the prior art, minimizing the potential for the drill pipe to become stuck. Finally, the mud of this invention is a mud with reduced potential for temperature-induced carbonate gellation.

These and other benefits of this invention will be apparent in reviewing this disclosure, the descriptions of the various embodiments of this invention, and the claims herein.

BRIEF DESCRIPTION OF THE DRAWINGS

All Five FIGURES herein are plots showing the viscosities in centipoise of the various fluids in the Examples as functions of temperature in degrees Farenheit.

DESCRIPTION OF THE PREFERRED EMBODIMENT

Figure 1A:
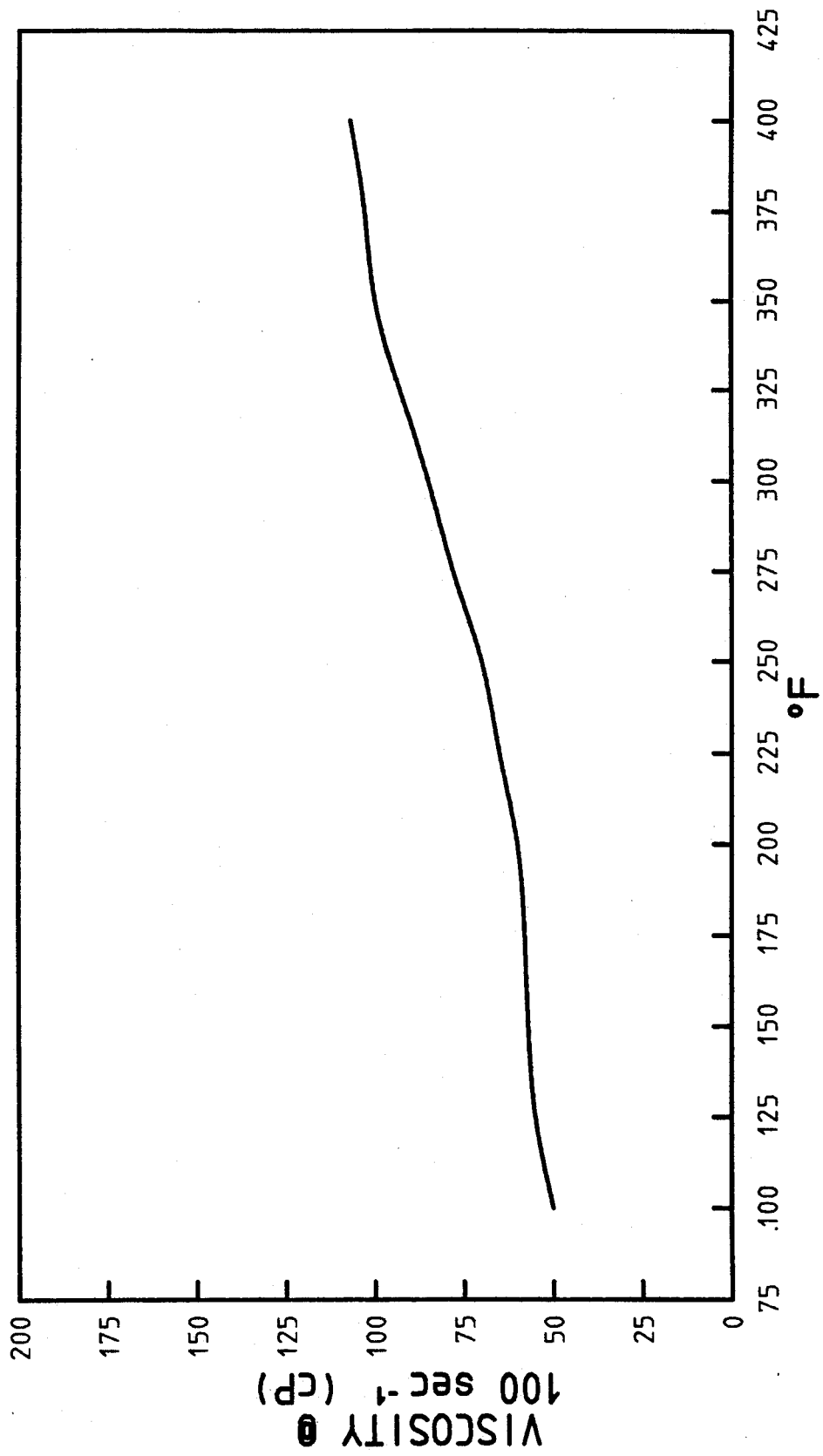
FIGS. 1A and 1B summarize the fluids 1A and 1B, respectively, of Example 1.

For years there has been a need for a water-based, rheologically stable drilling fluid for high temperature applications. Applicant's invention is a water-based slurry comprising three essential components, resulting in a drilling fluid having rheological stability. This broad temperature stability is created from the synergistic combination of the three components, and makes it unnecessary to add significant amounts of other rheology-modifying additives, except in the high-density version of this invention where rheology modifying additives are needed to work on the extremely high concentration of weighting material. However, deflocculants and other additives typically used in drilling muds can be beneficially added where needed, using techniques commonly known in the art. This invention is directed to adjusting and stabilizing the rheology and filtration of the drillingfluid with respect to temperature.

The three essential components are:

1. Good quality clay, such as bentonite, or any other clays as are used in the art, at about 2 to about 15 lb/bbl. The specifications for bentonite as used in drilling fluids are set forth in "Specification for Oil-Well Drilling-Fluid Materials," API Specification 13A (12th ed. October, 1988), American Petroleum Institute (hereinafter referred to as "Spec 13A"). Spec 13A sets forth specifications for both bentonite and nontreated bentonite. Either of these, as well as other clays as are used in the art, can be used in the mud of this invention. In the preferred embodiment, nontreated bentonite should be used in a concentration of 5 to 10 lb/bbl. This nontreated bentonite should be prehydrated in fresh water, in a concentration of 20 to 25 lb/bbl, preferably with no additives, for a minimum of four hours. Prehydration can also be accomplished outside of this concentration range or in a different amount of time.

2. A PCC viscosifier at about 1 to about 8 lb/bbl. In the preferred embodiment, presheared PCC should be used in a concentration of 1 to 3 lb/bbl. Preshearing of the PCC is best accomplished in the laboratory by mixing 20 lb/bbl of PCC with fresh water or sea water, then using a laboratory grade blender at high speed for 15 to 30 minutes until the yield point of the slurry is at least about 70 lb/100ft$^2$. For applications in the field, PCC is best presheared by mixing 20 lb/bbl PCC with fresh water or sea water, then circulating this slurry through a colloid mill or a modified homogenizer pump for a minimum of two hours, until the yield point of the slurry is at least about 70 lb/100ft$^2$, as measured by the yield point test of RP 13B-1. A small version of the modified homogenizer pump can also be used for preparation in the laboratory. Preshearing can also be accomplished outside of this concentration range in a different amount of time, to a lower yield point or with different equipment; the method described above is the preferred embodiment.

3. An inorganic salt, such as a sulfate salt or a chloride salt or other such salts or any combination thereof, at about 2,000 to 125,000 parts chloride, or a corresponding amount of other anionic salt species per million parts of fluid. In the preferred embodiment, a chloride salt essentially comprising sodium chloride is used and the range is 10,000 to 30,000 parts of chloride per million parts of fluid. Extensive testing of chlorides has been performed and set forth in the parent application. These test have confirmed the applicable ranges of chloride concentration for typical-density (up to about 15 pounds per gallon) drilling fluids. Additional testing since filing of the parent application has allowed a broadening of the chloride range from 5,000 to 110,000 ppm to 2,000 to 125,000 ppm.

The corresponding ranges for sulfates can be calculated by one skilled in the art using DLVO theory, which relates the "thickness" of the double layer to the ionic strength, I, of the medium. To a first approximation, colloidal materials (that is, drilling fluids) will exhibit similar behavior in aqueous media that have similar ionic strength. Ionic strength is calculated by means of a sum:

$I = \frac{1}{2} \Sigma m_i \times Z_i 2$, where m is molality (moles/kg water) and Z is ionic charge Therefore, 2,000 ppm of chloride corresponds to an ionic strength of about 0.056m. This translates to about 1,800 ppm of sulfate anion. Similarly, 125,000 ppm of chloride (ionic strength of about 4.29m) translates to about 114,500 ppm sulfate anion. For the narrower limits, 10,000 ppm of chloride is equivalent to about 9,150 ppm sulfate (ionic strength of 0.29m), and 30,000 ppm of chloride is equivalent to about 28,300 ppm of sulfate (ionic strength of 0.85m). An Example showing a drilling fluid with 27,500 ppm of sulfate is given. (Example 2) As is known in the art, the appropriate concentrations of other anions may be calculated using the DLVO theory.

The concentration of each component is customized to the particular application as a function of the drilling fluid density and the bottomhole temperature. Once the bottomhole temperature is known, the necessary density is determined, and a base mud is built using techniques commonly known in the art. This base mud is then customized using the following guidelines:

1. The yield point of the fluid is raised to between about 10 lb/100ft$^2$ and about 25 (30 for high-density) lbs/100ft$^2$, using the standard yield point test of RP 13B-1. In the preferred embodiment, this range is between 15 lbs/100ft$^2$ and 20 lbs/100ft$^2$. Achieving this yield point is accomplished by the addition of clay (preferably prehydrated) as long as the clay concentration is less than 10 lbs/bbl and the gel strengths are within the prescribed range set forth herein. If the clay concentration is greater than about 10 lbs/bbl or the gel strengths are at the maximum of the prescribed range, PCC (preferably presheared), and not clay, is added to raise the yield point.

2. The 10-second, 10-minute and 30-minute gel strengths are measured and adjusted to between about 3 lbs/100 ft$^2$ and about 10 (15 for high-density) lbs/100ft$^2$, between about 10 lbs/100ft$^2$ and about 30 lbs/100ft$^2$, and between about 20 lbs/100ft$^2$ and about 35 (50 for high-density lbs/100ft$^2$, respectively. In the preferred embodiment, these ranges are 4 lbs/100ft$^2$ to 8 (10 for high-density) lbs/100 ft$^2$, 15 lbs/100 ft$^2$ to 25 lbs/100 ft$^2$, and 20 lbs/100ft$^2$ to 30 lbs/100ft$^2$, respectively. This adjustment of gel strength is accomplished by the addition of clay, preferably prehydrated clay. The gel strengths are measured in accordance with the standard test set forth in RP 13B-1. As a practical matter, bringing the 10-second gel strength within range will generally result in acceptable 10-minute and 30-minute gel strengths with the mud of this invention. Therefore, it is usually sufficient to measure and adjust only the 10-second gel strength.

3. The filtration rate is adjusted so that the HTHP filtration test yields a value of less than 50 cc/30 min. at 500 psi and 300° F. In the preferred embodiment, the HTHP filtration rate should be lowered to less than 20 (30 for high-density) cc/30 min. at 500 psi and 300° F. This adjustment is accomplished by addition of clay, preferably prehydrated clay, if clay content is low (less than about 4 lbs/bbl), or with a temperature stable filtration polymer, such as Therma-Chek, Hostadrill, Kem-Seal, or other similar materials, otherwise. The HTHP filtration rate is measured via the standard test set forth in RP 13B-1.

4. The pH is adjusted to between about 9.0 and about 11.5. In the preferred embodiment, this range is generally 10.0 to 11.0. This adjustment is accomplished by the addition of alkalinity control materials such as caustic soda or soda ash or other similar materials as are well known in the art. The pH is measured via the standard test set forth in RP 13B-1.

5. The concentration of the anionic salt species is adjusted to between about 2,000 and about 125,000 parts of the chloride per million parts of the fluid, or the corresponding amount of other anion as calculated by the DLVO theory. In the preferred embodiment, this range is between 10,000 and 30,000 parts of chloride per million parts of the fluid, where the chloride originates from a chloride salt substantially comprising sodium chloride or from sea water or other brine. This adjustment of the salt concentration is accomplished by addition of an inorganic salt, such as sodium chloride or potassium chloride or sodium sulfate or calcium chloride or such other soluble inorganic salts, alone or in combination, as are commonly known in the art. The adjustment can also be accomplished by using sea water or other brine as the base fluid. Where chlorides are used, concentration of the chloride is measured via the standard test set forth in RP 13B-1. Where other inorganic salts are used, concentration of the anionic salt species is determined by use of Merck test strips, a testing method which is well known in the art, or any other analytical method for determination of concentration of anionic salt species.

These guidelines may be performed in any order, and the adjustment of any one of these critical properties as described above will not materially affect any of the other critical properties. For example, once the HTHP filtration rate is within range, adjustment of any or all of the other properties in accordance with these guidelines will not place the HTHP filtration rate substantially out of range. This is also true with the yield point, gel strengths, pH, and anionic salt species concentration. In fact, it is a significant benefit of this invention that the adjustment of filtration control, which filtration control is necessary to seal the wellbore and thus minimize fluid loss, is independent of the adjustment of the rheology of the mud of this invention. This benefit substantially simplifies the building of this mud over the building of the muds of the prior art.

As a general matter, as the bottomhole temperature increases, the circulating fluid will require the addition of more filtration control product to maintain the desired HTHP filtration rate. Further, as the density and the temperature of the fluid increase, less clay must be added to the circulating mud to maintain the yield point and/or gel strength within the desired range. Such increases in temperature and density also typically result in the fluid's requiring a different concentration of inorganic salt to maintain the synergistic effect of this invention.

Unlike the method of preparation of other fluids prepared in accordance with the prior art, no further guidelines are required for the preparation of the mud of this invention. Standard drilling fluid tests, such as Marsh funnel viscosity (FV), Bingham plastic viscosity (PV), room temperature filtration rate (API), filtrate alkalinity tests (Pm, Pf, Mf), and tests of the concentrations of calcium and carbonate, as are set forth in RP 13B-1, may also be performed; however, these measurements are not needed to control the performance of the mud of this invention.

As confirmed by the laboratory tests described in the Examples, clay (preferably prehydrated clay), inorganic salt, and PCC (preferably presheared PCC) must all be present to impart high temperature rheological stability. Fluids missing one or more of these three ingredients, or fluids containing all three ingredients but with one or more of these ingredients outside the prescribed ranges, generally do not exhibit the desirable rheological profile.

The benefit achieved from the addition of some level of salt as measured by chlorides and/or other anionic salt species is particularly surprising, as it has long been recognized in the blending of muds that salt intrusion tends to destabilize, rather than stabilize, mud rheology. The prior art frequently focuses on minimizing the concentration of salt in the mud. By sharp contrast, chloride salts and/or other anionic salt species are not only beneficial but also necessary for the stability of the mud of this invention.

It is believed that the key to improved temperature stability lies in minimizing the effect of the temperature-induced dispersion of clay packets. High temperature clay dispersion is apparently reduced by reducing the concentration of clay and by deliberately introducing salinity in the form of inorganic salts, the introduction of salinity being contrary to the teaching of prior art. Additional viscosity and filtration control is provided by polymers using techniques well known to one versed in the prior art.

Maintaining the concentration of the clay within a low range (about 2 to about 15 lb/bbl, but in the preferred embodiment 5 to 10 lb/bbl) results in good carrying capacity and suspension under the typical bottomhole conditions. Maintaining a low clay concentration further results in a reduction in the tendency to induce carbonate gellation in the fluid. It is believed that dispersion resistance for both drilled solids and clay is attained by the presence of the salt species in the mud of this invention. Finally, surface rheology and stability is provided by clay (preferably prehydrated) and PCC (preferably presheared), while filtration is controlled by high-temperature filtration polymers interacting with the clay.

Further testing since the filing of the parent application has taught that the salinity levels for high-density drilling fluids can be somewhat lower without a loss of rheological stability. For the purpose of this discussion, a drilling fluid will be considered to be high-density where it is denser than about 16.0 pounds per gallon. Examples are presented suggesting that the lower end of the range should be about 2,000 ppm chloride (or about 1,800 ppm sulfate) in such high-density applications.

In such high density applications, the use of a temperature-stable deflocculant is necessary in the best mode of this invention, at a concentration of between about 0.5 lb/bbl and 5.0 lb/bbl, as is seen in the Examples.

EXAMPLES

The following materials were employed in preparing the fluids discussed in the Examples:

Prehydrated Clay: Aquagel Gold Seal, a nontreated bentonite clay manufactured according to Spec 13A, manufactured by Baroid Drilling Fluids, Inc., prehydrated using the technique specified above.

Presheared PCC: HP-007, manufactured by Aqualon Company, presheared using the technique described above.

Drilled Solids: Rev-Dust, manufactured by Milwhite Co.

Deflocculants: Miltemp, manufactured by Milpark Drilling Fluids; or Therma-Thin, manufactured by Baroid Drilling Fluids, Inc.

Filtration Control Materials: Therma-Chek, sold by Baroid Drilling Fluids, Inc.; Filtrex or Pyrotrol, both manufactured by Milpark Drilling Fluids; Driscal D, sold by Drilling Specialties Company; low viscosity polyanionic cellulose (Pac-L), sold by Baroid; or Dextrid, premium stabilized non-fermentable starch, sold by Baroid.

Inorganic Salt: Industrial grade sack salt comprising substantially sodium chloride, or Sea-Salt, manufactured by Lake Chemical Company, or sodium sulfate or calcium chloride industrial grade (anhydrite or dihydrate).

Barite: A commercial API specification grade of barium sulfate, meeting the specifications of Spec 13A, used as a weighting agent in downhole fluids.

All other reagents, additives or chemicals are commercial grades obtained through retail chemical distributors.

Samples for the tests described in Examples 1 through 4 herein were prepared on a standard Hamilton Beach mixer as is typically used by persons practicing the art. Materials in the proportions set forth in the Examples were added to water in the following order: prehydrated clay, presheared PCC, inorganic salt, drilled solids, deflocculants, filtration control materials, caustic for pH adjustment, and barite in an amount sufficient to achieve the target fluid density. After each addition, the sample was stirred in the mixer for about 5 to 10 minutes or until well mixed. After all materials were added, the sample was then equilibrated by heating for about 16 hours at 150° F. in a roller oven, which oven is well known to practitioners of the art. After equilibration, the sample was stirred in the mixer for 10 to 30 minutes and the pH was readjusted with caustic addition as necessary. The sample was then aged for about 16 hours to between 375° F. and 400° F., as set forth in the pertinent Example, in a roller oven. The sample was stirred for 10 to 30 minutes in the mixer and the pH was again readjusted with caustic addition as necessary.

The following test was performed upon samples of the fluids in the Examples to obtain the rheological profiles: Using a Fann 50C Viscometer, a room temperature sample was inserted into the instrument and pressurized to 500 psi with nitrogen. The sample was sheared continuously at a shear rate of 102 sec$^{-1}$, corresponding to an instrument reading of 60 rpm. The temperature of the sample was increased at a rate of 2 F.°/minute from room temperature to 120° F. While the temperature of the sample was maintained at 120° F., measurements of plastic viscosity, yield point and gel strengths were taken in accordance with the procedures set forth in RP 13B-1. The temperature of the sample was then increased from 120° F. to a peak temperature of roughly 400° F, as further set forth in the Examples, at 2 F.°/minute. At this peak temperature, plastic viscosity, yield point and gel strengths were measured in accordance with RP 13B-1, while the temperature of the sample was maintained at the peak temperature. Finally, the sample was cooled from the peak temperature to 120° F. at 6 F.°/minute. At 120° F., the plastic viscosity, yield point and gel strengths were again determined in accordance with RP 13B-1 while the temperature of the sample was maintained at 120° F. While the sample was in the process of being heated or cooled, readings of shear stress as a function of temperature were taken at one minute intervals. Shear stress is converted to effective viscosity at 102 sec$^{-1}$ by multiplying the output by 5.0. The heating curve was graphed as a series of closely spaced dots representing the data points; the cooling curve was graphed as a solid line connecting the data points collected during the cooling phase. These curves are the curves depicted throughout the FIGURES herein for each of the fluids tested.

Each of the remaining tests which were performed upon the samples of the drilling fluids discussed in the Examples were standard tests for drilling fluids, which tests are set forth in RP 13B-1.

EXAMPLE 1

Figure 1B:
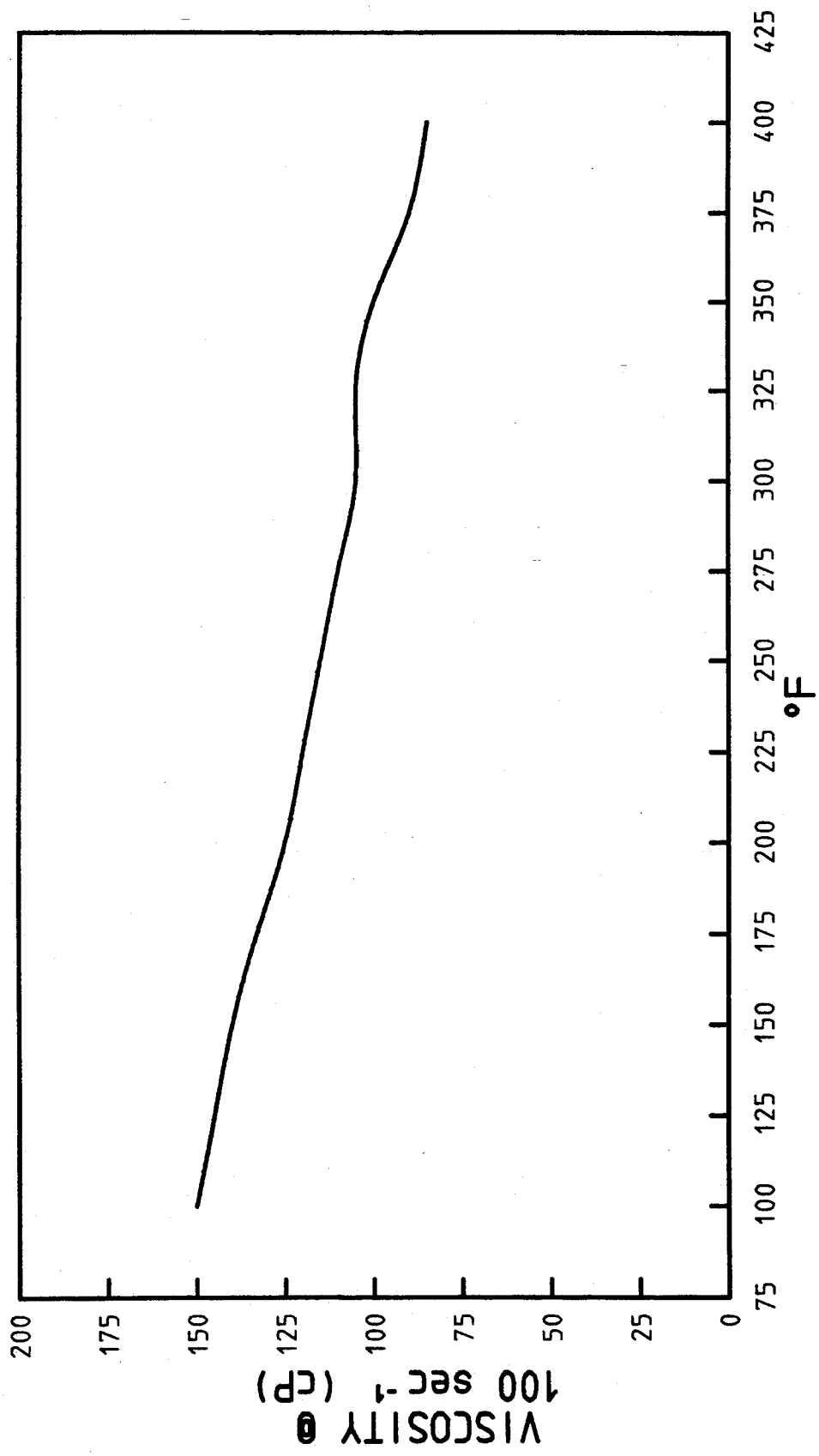

One water-based field sample, Fluid 1A with elevated calcium and chloride levels, was taken and measured. This is a field sample which was being circulated (and therefore aged) near 300° F. Its composition and physical properties are set forth in Table 1. Although the rheological properties are stable, within the invention, the particular filtration materials either have not been optimized for calcium chloride brine, or are unstable near 300° F. FIG. 1A shows its rheological stability from 75° F. through 400° F., and confirms that it can tolerate calcium salts. Another water-based sample, Fluid 1B, is an example from laboratory tests using a calcium-tolerant filtration material such as Driscal D. This sample was aged overnight at 375° F. Its composition and physical properties are set forth in Table 1. This table demonstrates that, even in the presence of calcium as the cationic species, the fluid maintains both acceptable rheological and filtration control. FIG. 1B shows its rheological stability (after aging in the field at about 375° F.) from 75° F. through 400° F. FIG. 1B confirms that even with calcium as the cation the fluid maintains a similar rheological profile. Thus, this invention should include calcium chloride.

EXAMPLE 2

Figure 2:
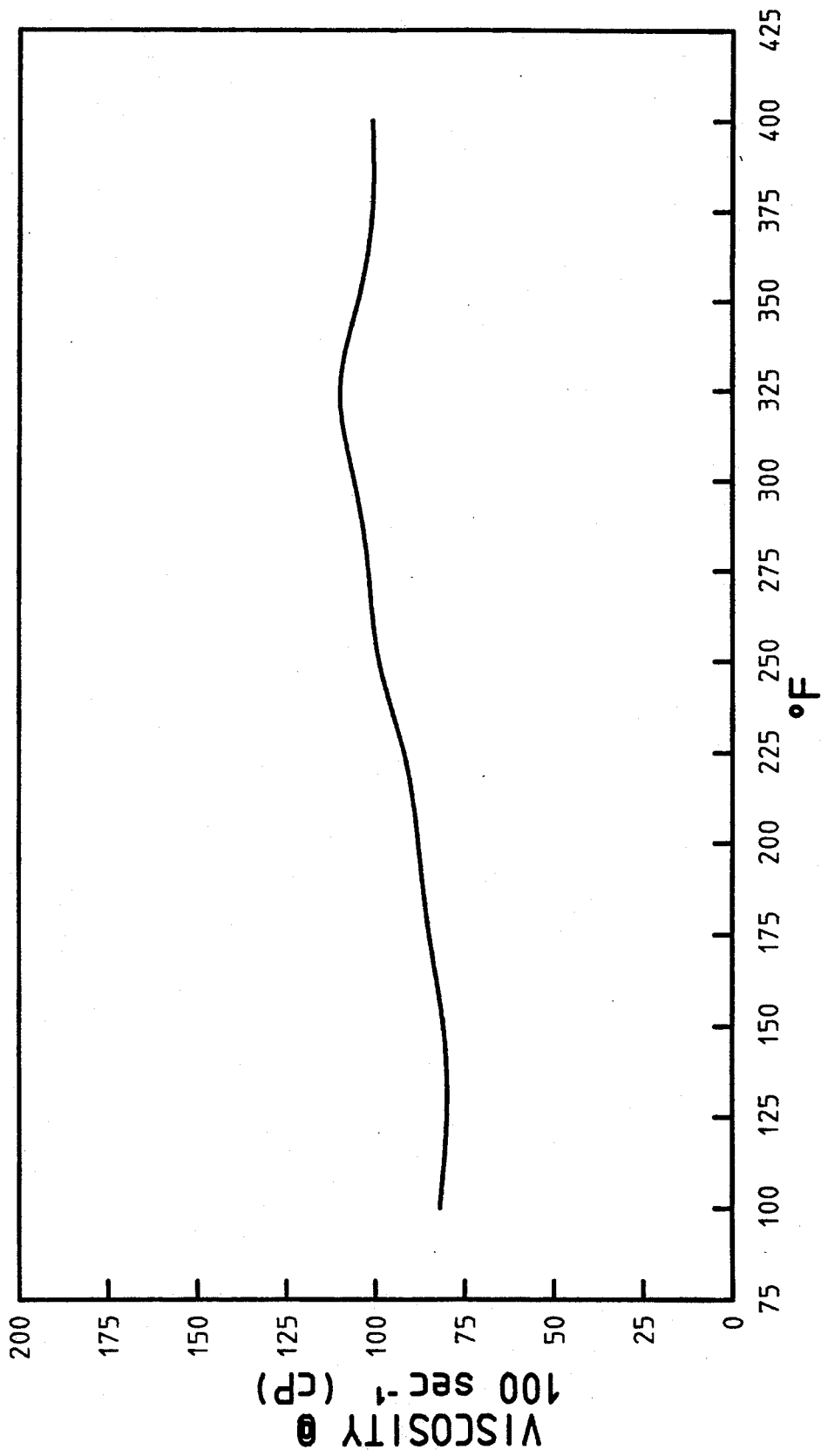
FIG. 2 summarizes the fluid of Example 2.

A field test was run using sodium sulfate as the inorganic salt in combination with the sodium chloride of the best mode. This sample, Fluid 2, came from a well being drilled at 21,850 ft., with a bottomhole temperature of about 390° F., which is equivalent to aging at 390° F. Table 2 sets forth pertinent lab data regarding the rheological and filtration characteristics of this sample, and FIG. 2 illustrates its rheological stability from about 75° F. to about 400° F.

EXAMPLE 3

Figure 3A:
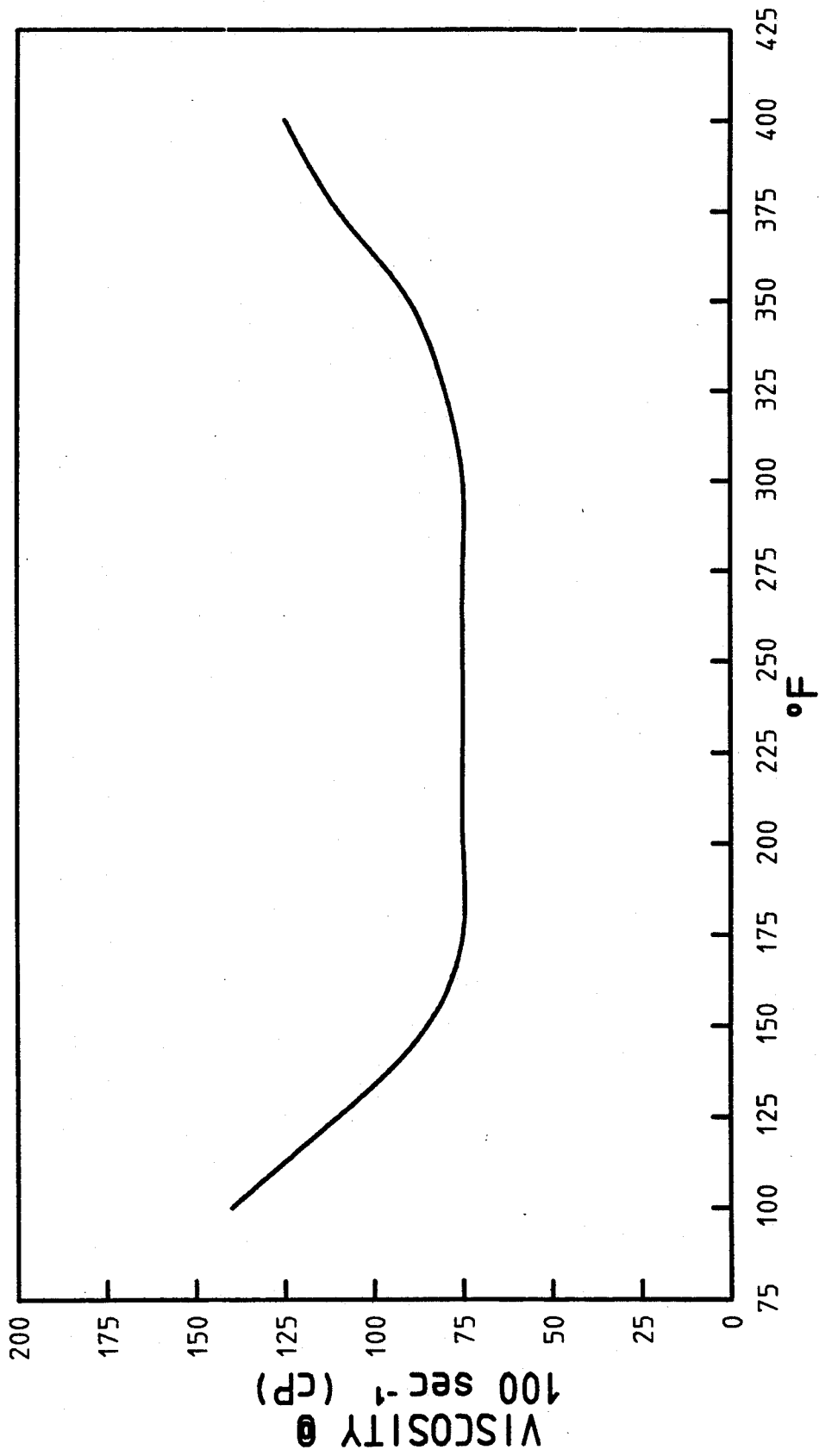
FIGS. 3A and 3B summarize the fluids 3A and 3B, respectively, of Example 3.
Figure 3B:
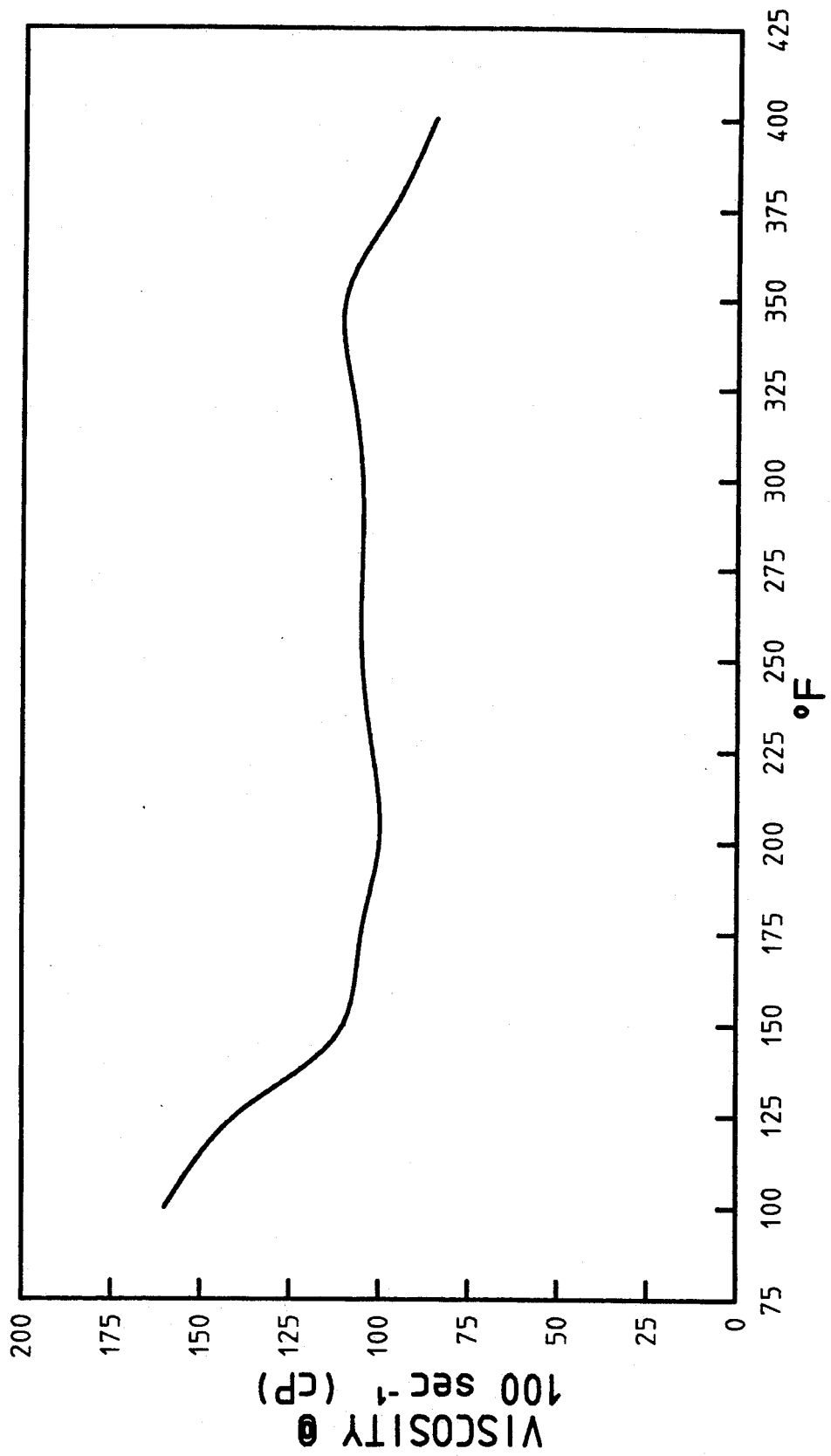

Three high-density drilling fluids, 3A, 3B and 3C were prepared; their compositions and relevant properties are set forth in Table 3. FIGS. 3A and 3B present rheological stabilities for two of the fluids. All samples were aged at 400° F. before the measurements These fluids demonstrate that, in high-density applications, salinities as low as 2,000 ppm of chloride (or the equivalent) can be used without loss of rheological stability. Fluid 3C has less acceptable rheological properties than 3A and 3B, due to the lower deflocculant level and the particular filtration material that was selected. For that reason, no temperature profile was performed on Fluid 3C.

TABLE 1

Presence of Calcium Cation

| | Sample A | Sample B |
|---|---|---|
| Bentonite equivalent, lbs/bbl | | 10.5 |
| Presheared PCC, lb/bbl | 3.0 | 2.5 |
| Drilled Solids, vol. % | 5–6 | 5–6 |
| Deflocculant | — | 0.40 |
| Miltemp, lb/bbl | | |
| Filtration Material, lb/bbl | | |
| Therma-Chek | 1.0 | 2.0 |
| Driscal D | — | 3.0 |
| Low viscosity PAC | 2.0 | — |
| Dextrid | 3.0 | — |
| Chloride, ppm | 83,071 | 34,820 |
| Calcium, ppm | 9,486 | 7,180 |
| Fluid Density, lb/gal | 12.2 | 10.4 |
| pH | 9.8 | 10.0 |
| Yield Point, (lbs/100 ft$^2$) | 13 | 28 |
| Gel Strengths, (lbs/100 ft$^2$) | | |
| 10 seconds | 8 | 29 |
| 10 minutes | 14 | 35 |
| 30 minutes | 22 | 44 |
| HTHP Filtration Rate | 190 | 26 |

TABLE 1-continued

Presence of Calcium Cation

|  | Sample A | Sample B |
| --- | --- | --- |
| @ 300° F. (cc/30 min.) |  |  |

TABLE 2

Presence of Sodium Sulfate

| | |
| --- | --- |
| Bentonite equivalent (lbs/bbl) | 9.5 |
| Presheared PCC, lb/bbl | 2 |
| Drilled Solids, vol. % | 5-6 |
| Defloculant Miltemp, lb/bbl | 0.30 |
| Filtration Material Therma-Chek, lb/bbl | 4.0 |
| Chloride (ppm) | 12,000 |
| Sulfate (mg/L) | 27,500 |
| Fluid Density, lb/gal | 11.0 |
| pH | 11.2 |
| Yield Point (lbs/100 ft$^2$) | 18 |
| Gel Strengths (lbs/100 ft$^2$) | |
| 10 seconds | 8 |
| 10 minutes | 18 |
| 30 minutes | 22 |
| HTHP Filtration Rate cc/30 min) (@ 300° F.) | 30.0 |

TABLE 3

Low Bentonite Concentration with High Density Fluids

| | 3A | 3B | 3C |
| --- | --- | --- | --- |
| Prehydrated Aquagel, lb/bbl | 5 | 5 | 5 |
| Presheared PCC (lb/bbl) | 2 | 2 | 1 |
| Drilled Solids vol. % | 5 | 5 | 3 |
| Deflocculant Therma-Thin lb/bbl | 3 | 3 | 2.5 |
| Filtration Material | | | |
| Pyrotrol, bl/bbl | 3 | — | — |
| Therma-Chek, lb/bbl | — | 5 | — |
| Filtrex, lb/bbl | — | — | 6.5 |
| Chloride, ppm | 2057 | 2127 | 2623 |
| Fluid Density, lb/gal | 17.9 | 17.9 | 18.2 |
| pH | 11.06 | 11.03 | 11.1 |
| Yield Point, lb/100 ft$^2$ | 15 | 28 | 8 |
| Gel Strengths, lb/100 ft$^2$ | | | |
| 10 Seconds | 4 | 5 | 3 |
| 10 minutes | 5 | 12 | 39 |
| 30 minutes | 9 | 24 | 52 |
| HTHP Filtration Rate, Rate, cc/30 min (@ 300° F.) | 44 | 47 | 48 |

What is claimed is:

1. A water-based drilling fluid, comprising: clay, a soluble inorganic salt and parenchymal cell cellulose, wherein the ionic strength of the soluble inorganic salt is between about 0.056m and about 4.29m.

2. A water-based drilling fluid, comprising: calcium chloride, parenchymal cell cellulose, and clay, wherein the concentration of chloride is between about 2,000 and about 125,000 parts chloride per million parts of said drilling fluid.

3. A water based drilling fluid, comprising: a sulfate selected from the group consisting of sodium sulfate, potassium sulfate, magnesium sulfate, calcium sulfate, or mixtures thereof, and parenchymal cell cellulose and clay, wherein the concentration of sulfate ion is between about 1,800 and about 114,000 parts of sulfate per million parts of said drilling fluid.

4. The drilling fluid of claim 1, wherein the ionic strength of said soluble inorganic salt is between about 0.29m and about 0.89m.

5. The drilling fluid of claim 1, wherein said inorganic salt is selected from the group consisting of: (1) sodium sulfate, (2) potassium sulfate, (3) magnesium sulfate, (4) calcium chloride, and (5) any combination thereof, alone or (6) in combination with one or more of sodium chloride, potassium chloride, and magnesium chloride.

6. The drilling fluid of claim 4, wherein said inorganic salt is selected from the group consisting of: (1) sodium sulfate, (2) potassium sulfate, (3) magnesium sulfate, (4) calcium chloride, and (5) any combination thereof, alone or (6) in combination with one or more of sodium chloride, potassium chloride, and magnesium chloride.

7. The water-based drilling fluid of claim 1, wherein the concentration of said parenchymal cell cellulose is between about 1.0 and about 8.0 pounds per barrel; and the concentration of said clay is between about 2 and about 15 pounds per barrel.

8. The water-based drilling fluid of claim 1, wherein the concentration of said parenchymal cell cellulose is between about 1.0 and about 3.0 pounds per barrel; and the concentration of said clay is between about 5 and about 10 pounds per barrel.

9. A water-based drilling fluid, with a density above about 16.0 pounds per gallon, comprising: an inorganic salt, parenchymal cell cellulose, and clay; wherein the ionic strength of soluble inorganic salt is between about 0.056m and 4.29m.

* * * * *